United States Patent Office 3,009,500
Patented Nov. 21, 1961

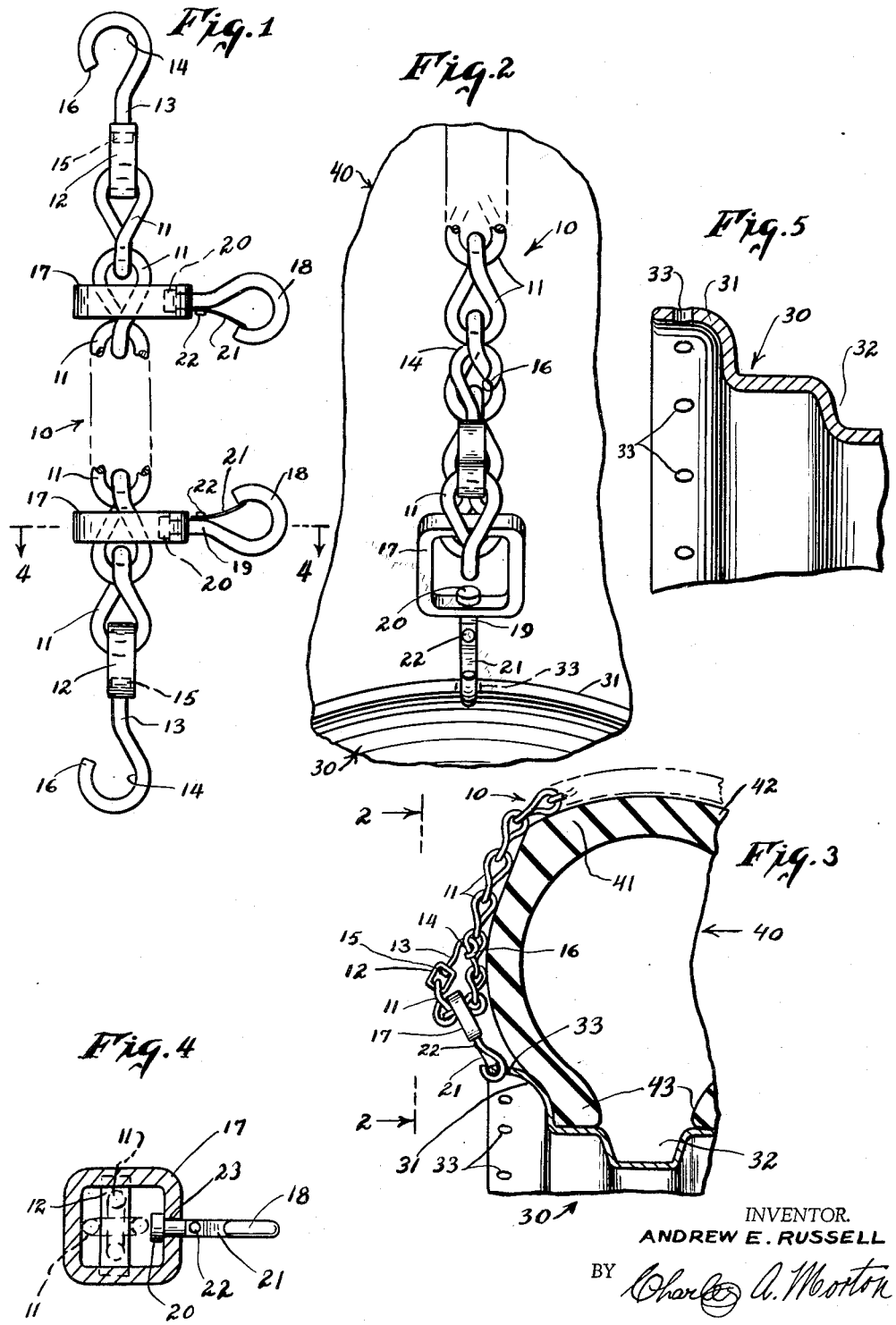

3,009,500
ADJUSTABLE ANTI-SKID CHAINS
Andrew E. Russell, 2412 Camp Ave., Bellmore, N.Y.
Filed May 29, 1961, Ser. No. 113,251
8 Claims. (Cl. 152—232)

This invention relates to improvements in anti-skid chains, and more particularly to adjustable anti-skid chains.

Anti-skid chains are usually made to fit a wheel or tire rim of a particular size, hence it is necessary to make a series of anti-skid chains in different sizes to fit the variously sized tire rims. Automobile tires also vary appreciably in cross sectional area, hence an anti-skid chain which is designed to fit a tire of small cross section is too short to install around the tread of a tire of large cross section. Anti-skid chains are also difficult to install particularly under the adverse weather and highway conditions of snow or ice which make the installation of anti-skid chains necessary.

One object of this invention is an anti-skid chain which is readily adjustable to automobile tires of different sizes.

Another object is an anti-skid chain which is easily installed by even an unskilled person.

Another object is an anti-skid chain which can be installed around the tread of an automobile tire and removed therefrom independently of any other anti-skid chain.

Another object is an adjustable anti-skid chain of but few and simple parts, which is easy and economical to manufacture, and which is very efficient and durable in use.

Another object is an adjustable anti-skid chain unit which can be readily removed and replaced when broken or otherwise damaged without disturbing or in any way affecting other anti-skid chain units which may be positioned around or across the tread of the tire.

Other objects will appear from the detailed description.

One embodiment of the invention is shown in the drawing wherein:

FIG. 1 is a plan view of my improved length-adjustable anti-skid chain with certain of the links thereof partially broken away and/or omitted as indicated in broken lines.

FIG. 2 is a front elevation of a fragment of the anti-skid chain of FIG. 1 adjusted and attached to the rim of a wheel, taken along the line 2—2 of FIG. 3, looking in the direction of the arrows, and showing a fragment of a rim and of a tire to illustrate how the anti-skid chain is adjusted and installed.

FIG. 3 is a cross sectional view of a fragment of a rim and of a tire showing one end of an anti-skid chain installed in position and length-adjusted transverse the tire.

FIG. 4 is a cross sectional view of a detail, taken along the line 4—4 of FIG. 1, looking in the direction of the arrows; and FIG. 5 is a cross sectional view of a fragment of the rim of an automobile wheel as modified for use in conjunction with my length-adjustable anti-skid chain.

Like reference characters designate corresponding parts throughout the several figures of the drawing.

The adjustable chain 10 may be of any suitable link construction which is conventional in anti-skid chains now in use, and the links 11, 11 may be made of steel or of any other metallic substance of comparable durability able to resist the abrasive action to which anti-skid chains are subjected when in use. Each link 11 provides sufficient clearance for adjoining links to allow the links to be turned in any desired direction, thus permitting the chain to be doubled back upon itself as illustrated in FIGS. 2 and 3.

At each end of the chain a terminal link 12, 12 is attached (FIG. 1). A hole is pierced through the wall of each link 12 to receive the shank 13 of one of the hooks 14, 14. The head of each shank 13 is peened over at 15 so that while the hook 14 is free to swivel about its terminal link 12 it cannot be detached from its terminal link 12. The diameter or thickness of the stock from which the hooks 14, 14 are fabricated is such that the point 16 of each hook 14 will pass through the eye of any of the links 11, 11 and the bight of each hook 14, 14 is such that the hook will curve around the link 11 to form a secure interconnection therebetween.

To effect length adjustment of the anti-skid chain 10, the chain is threaded through one or more O-shaped loops or eyes 17. The opening in each eye 17 is large enough to permit said eye to run freely over the links 11, 11 of anti-skid chain 10, but each eye 17 is too small to slide over either of the terminal links 12; thus while each eye 17 is free to travel along the chain 10 towards and away from the end thereof, its travel is arrested when it engages a terminal link 12 (FIG. 4).

A hook 18 is suitably attached to each eye 17 by means of the shank 19. Each hook 18 is preferably swivelled to its associated eye 17 as by piercing a hole in the wall of the eye 17 large enough to rotatably receive the end of the shank 19 and by then peening over the end of the shank to form the enlarged head 20 for retaining the hook 18 in eye 17.

The hook 18 may be a snap hook in which case the bight of the hook may be closed by a spring catch 21 secured at one end to the shank 19 in any preferred manner as by the rivets 22, 22. If preferred, the hooks 14, 14 may also be snap hooks.

To effect length adjustment of the anti-skid chain 10, the chain is drawn through the eye 17 after the hook 18 has been secured in one of the holes or slots formed in the peripheral edge of the felloe of the wheel 30. The felloe 31 of which only a fragment is shown (FIGS. 3 and 5), is suitably channelled at 32 to receive and anchor the beads 43, 43 of the tire 40. A series of holes or slots 33, 33 are formed at spaced intervals around the peripheral edges of the felloe 31 of the wheel 30, and after one end of the anti-skid chain 10 has been suitably secured to the inner peripheral edge of the felloe 31 of the wheel 30 (as by hooking the oppositely disposed hook 18 in one of the holes or slots 33 formed in the oppositely disposed peripheral edge (not shown) of the felloe 31 and then taking up a portion of the slack in the chain 10 by hooking its associated hook 14 through one of the adjacent links 11), the anti-skid chain 10 is adjusted around the tread 41 of the tire 40, the snap hook 18 is hooked through one of the holes or slots 33 formed in the outer peripheral edge of the felloe 31 of the wheel 30 and any slack remaining in the anti-skid chain 10 is taken up by drawing the hook 14 towards the crown 42 of the tread 41 of the tire 40, and hooking said hook 14 through the eye of one of the links 11 (FIG. 3), while the chain 10 is thus retained under tension.

Alternatively, the anti-skid chain may be partially length adjusted before it is installed upon the wheel 30, as by taking up some of the surplus links through an eye 17 of the eye-swivelled hooks 18, 18 at one end of the chain 10 and folding said surplus links back upon the chain 10 and hooking the hook 14 at the end of said surplus links through and around one of the links 11 lying in between the eyes 17, 17. The hook 18 of the eye 17 contained by the surplus links may then be attached through one of the slots 33 in the felloe or felly 31 of the wheel 30, and the chain fitted over the tread 41, crown 42, and sidewalls of the tire 40 to effect partial length-adjustment of the anti-skid chain; the oppositely disposed hook 18 at the free end of the chain 10 may then be moved inwardly along the chain by means of the eye 17 of said hook 18 until said hook 18 registers with the appropriate slot 33 in the opposite flange of the felly 31 of the wheel 30; the hook 18 is free to swivel upon its eye 17 into the most convenient position for hooking through the slot 33; after said hook 18 is attached to said slot, the chain 10 is drawn through the eye 17 to apply anti-skid tension to the portion of the chain which straddles the tread and crown of the tire 40 and effect length-adjustment thereof; the surplus links are drawn back over the eye 17, and while said surplus links are held under tension the hook 14 is swivelled about its terminal link 12 into position to hook around one of the links 11 lying between the eyes 17, 17, thus locking the chain 10 under anti-skid tension and in length-adjusted position.

Each anti-skid chain 10 is designed to be installed separately, hence the installer may select the most accessible pair of slots 33, 33 in the felly 31 of the wheel 30 when installing said chain, and may move the automobile in either direction to turn the wheels 30, 30 thereof to any position desired to facilitate installation of the anti-skid chains 10, 10. Similarly, when stalled in a rut or the like, the operator of the automobile can install these anti-skid chains upon the wheels without inconvenience and quite expeditiously.

The anti-skid chains 10 are made long enough to adjust to wheels of different cross widths or felly sizes, as well as to fit tires of various transverse girths. Thus, when installed upon a small sized tire, there may be a substantial number of surplus links at each end of the anti-skid chain, and when installed upon a large sized tire it may be necessary to utilize all of the links 11, 11 across the tread of the tire and to hook the terminal hooks 14, 14 in the slots 33, 33 in the felly 31; the eye-swivelled hooks 18, 18 may, under such conditions, be hooked together at one end of the anti-skid chain.

The end links 11, 11 situated at each end of the anti-skid chain and which constitute the surplus links when the chain is adjusted to a shortened length, are not subjected to as much wear and tear as those links adjacent the centre of the chain which straddle the crown and the tread of the tire to develop traction for the wheels. The links adjacent the opposite ends of the chain and which are generally used to shorten the chain, that is, the surplus links, so called, may accordingly be made smaller than the links located in the central section of the chain 10, thus reducing the size of the terminal hooks 14, 14 and of the eye-swivelled hooks 18, 18.

In those cases where maximum flexibility, or the length-adjustment required, does not necessitate making the anti-skid chain adjustable for length at both ends of the chain, one of the eyes 17 and its associated hook 18 may be omitted, the terminal hook 14 may be used to anchor the chain 10 to one of the slots 33 of the felly 31, and the remaining eye-swivelled hook 18 and the opposite terminal hook 14 adjacent thereto may be used in conjunction, in the manner previously described, to effect length-adjustment and impart anti-skid tension to the chain 10.

What is claimed is:

1. In an anti-skid device for an automobile wheel which is adapted to accommodate pneumatic tires of various girths and which has a channeled rim confined between two oppositely disposed peripheral flanges for accommodating tires which flanges are provided with a series of holes formed at correspondingly spaced intervals around their peripheral edges so that the correspondingly spaced holes in each flange form a pair of holes and in combination, a series of links loosely coupled together to form a flexible chain, said chain being long enough to extend transversely across the tread of a tire when mounted in said channel and to project radially inwards beyond each of said peripheral flanges, means including a hook positioned adjacent one end of said chain adapted to engage in one hole of any selected pair of holes to detachably attach the said end of said chain to one of said peripheral flanges, an eye having a hook associated therewith, said eye being large enough to receive the links of said chain when threaded in succession through said eye, said chain when threaded through said eye enabling the hook associated with said eye to travel along said chain to bring said hook into hooking engagement with the correspondingly spaced paired hole in the flange preparatory to drawing said chain through said eye to effect length adjustment of the chain and impart anti-skid tension to the chain relative to a tire, the chain drawn through said eye constituting surplus chain, a terminal hook positioned at the free end of said surplus chain, and said surplus chain being subjected to tension and taken up by folding it back alongside the length-adjusted portion of the chain to permit said hook to be hooked around the link of the length-adjusted portion of the chain lying alongside said hook and lock said anti-skid device against any change of anti-skid tension.

2. In an anti-skid link-chain device adjustable to automobile tires of various girths wherein the beads for anchoring the tires are positioned between two wheel rim flanges and are retained in position by air pressure and wherein a series of holes are formed at correspondingly spaced intervals around the peripheral edges of each of said rim flanges, the correspondingly spaced holes in each flange constituting paired holes, and in combination, a series of links loosely coupled together to form a flexible chain, said chain being long enough to stretch transversely around automobile tires of various girths when retained in position between said rim flanges and being length adjustable around any such tires and between paired holes in said rim flanges, a pair of eyes, each of said eyes being sized to receive said links when threaded through either of said eyes, a pair of hooks one for each of said eyes, each of said hooks being mounted to swivel upon its said eye, said eyes being threaded on said chain and movable therealong to adjust said hooks towards and away from said rim flanges and the paired holes therein, said hooks being sized to pass through and hook around any of the paired holes in said rim flanges, said chain terminating at each end thereof in an end hook, each of said end hooks being mounted to swivel upon the end of said chain, said end hooks being effective to retain said eye-swivelled hooks upon said chain, the opposite ends of said chain being operable when said eye-swivelled hooks are secured in oppositely spaced holes in said rim flanges to draw the ends of said chain in opposite directions to adjust said chain transverse an automobile tire when retained in position between said rim flanges and impart anti-skid tension to said chain, and said end hooks being operable to pass through and hook upon other links in said chain to lock said chain under anti-skid tension.

3. In a ready-to-use length-adjustable anti-skid chain useful for attachment to the felly of an automobile wheel to develop wheel traction on snow and ice and in combination a series of links loosely coupled together to form a flexible length of anti-skid chain which is long enough to stretch transversely across the tread around the side walls and to the region of the beads of an automobile tire when mounted upon an automobile wheel and fully inflated, said links being coupled loosely enough to form a chain which is sufficiently flexible to fold back upon itself, a hook connected adjacent one end of said chain adapted to be secured near the peripheral edge of one side of the felly of such wheel, an eye, a hook depending from said eye, said eye being threaded upon and travelling along said chain to enable said hook to be secured near the peripheral edge of the opposite side of such felly of such wheel, said threaded chain sliding through said eye to adjust the chain across the tread of the tire under anti-skid tension and to measure off the surplus chain, and a hook attached to the free end of said surplus chain for hooking through and around a link of the chain when folded back upon itself thereby locking said chain under anti-skid tension and against change of length adjustment.

4. A ready-to-use length-adjustable anti-skid chain as defined in claim 3 wherein the hook depending from said chain-threaded eye is a snap hook.

5. In a length-adjustable ready-to-use anti-skid chain useful for attachment between the opposite peripheral edges of the felly of an automobile wheel whereon tires of various girths may be interchangeably mounted and inflated said anti-skid chain being capable of adjustment around tires of various transverse girths when said tires are anchored in the felly of said wheel and in combination a series of links, said links being loosely interconnected in series to form an anti-skid chain which is sufficiently flexible to be reversely foldable, said chain being long enough to extend transversely across the crown and the side walls of a tire when anchored in the felly of said wheel and from one beaded edge of said tire to the other, two eye-swivelled hooks, said chain being threaded through each of said eyes and being slidable through said eyes to adjust said eyes along said chain at a spacing substantially equal to the girth of the tire when measured transversely between the peripheral edges of the felly of said wheel and to mark off surplus links at opposite ends of said anti-skid chain, said eye-swivelled hooks being adapted to be detachably attached to the opposite peripheral edges of said felly preparatory to placing said chain under anti-skid tension, terminal hooks, one such terminal hook being swivelled at each end of said chain, said terminal hooks being large enough to retain said eye-swivelled hooks upon said chain, the surplus links when drawn in opposite directions relative to the felly effecting length-adjustment of said chain across the crown and side walls of a tire to impart anti-skid tension to said chain, said surplus links being reversely foldable along the side walls of the tire, and each of said terminal hooks swivelling about said chain and being attachable to a link thereof lying between the eyes of said eye-swivelled hooks to lock said chain under anti-skid tension and in length-adjusted position.

6. A length-adjustable ready-to-use anti-skid chain as defined in claim 5 wherein the hooks of the eye-swivelled hooks are snap hooks.

7. A length-adjustable ready-to-use anti-skid chain as defined in claim 5 wherein the hooks of the eye-swivelled hooks and the terminal hooks are snap hooks.

8. A length-adjustable chain as defined in claim 5 wherein the links positioned at the opposite ends of the chain and which constitute the surplus links are relatively smaller than the links intermediate said surplus links and the links intermediate said surplus links and which are adapted to extend transversely across the crown and the side walls of the tire are relatively larger and heavier than the surplus links.

References Cited in the file of this patent

UNITED STATES PATENTS

| | | |
|---|---|---|
| 1,523,499 | Sullivan | Jan. 20, 1925 |
| 2,491,366 | Farley | Dec. 13, 1949 |
| 2,878,640 | Johnson | Mar. 24, 1959 |